(No Model.)
C. ULFIG.
MANUFACTURE OF HOLLOW GLASS ARTICLES.
No. 472,631. Patented Apr. 12, 1892.
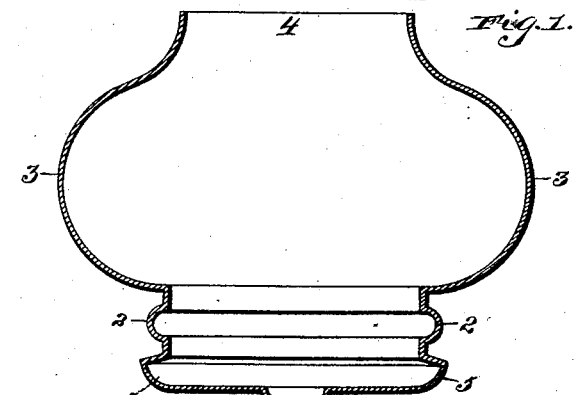
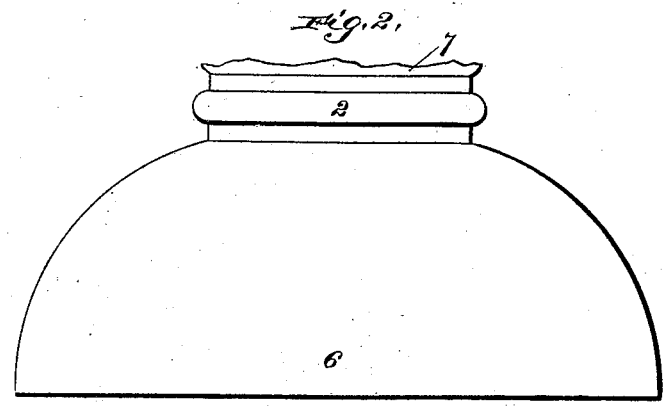
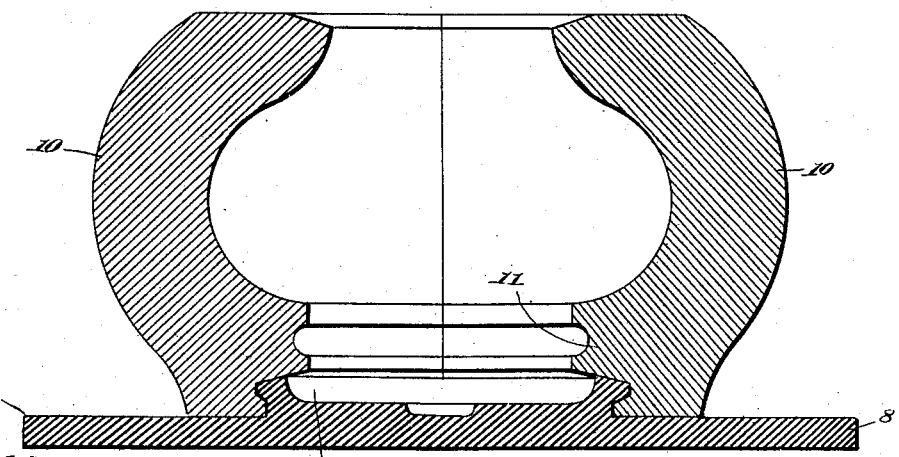
Witnesses
C. Byrnes.
H. B. Corwin
Inventor:
Charles Ulfig
by W. Bakewell & Sons
his Attorneys

UNITED STATES PATENT OFFICE.

CHARLES ULFIG, OF MARTIN'S FERRY, OHIO.

MANUFACTURE OF HOLLOW GLASS ARTICLES.

SPECIFICATION forming part of Letters Patent No. 472,631, dated April 12, 1892.

Application filed June 11, 1891. Serial No. 395,900. (No model.)

*To all whom it may concern:*

Be it known that I, CHARLES ULFIG, of Martin's Ferry, in the county of Belmont and State of Ohio, have invented a new and useful Improvement in the Manufacture of Hollow Glass Articles, of which the following is a full, clear, and exact description, reference being had to the accompanying drawings, forming part of this specification, in which—

Figure 1 is a cross-sectional view of a partially-completed shade formed in accordance with my invention. Fig. 2 is a side elevation of the same opened out and ready for the annealing-oven, and Fig. 3 is a cross-section of the mold employed in my process.

Heretofore in manufacturing glass shades the shade has been blown upright, with the upper portion of finished form and with a projection upon the lower unfinished portion, which projection is then knocked off and the unfinished portion reheated and expanded into final form. The blow-pipe is then detached, leaving a rough cone-shaped portion projecting from the top of the shade, which is afterward cut away. In my improved process the shade is blown in reversed position, the finished portion being at the bottom of the mold and the blow-pipe being attached to the upper unfinished portion, while the crack-off or blow-over is formed below the finished portion. The blow-pipe is then removed, leaving a hole for the purpose of opening out the globe, and a rod or punty is attached to the blow-over, by means of which the globe is manipulated during the process of expansion. When the globe has been opened into final form, the crack-off is then removed, leaving the shade ready for the oven.

In the drawings, 2 represents the finished portion of the globe, 3 the unfinished portion, 4 the hole left by detaching the blow-pipe, 5 the crack-off or blow-over, and 9 a protuberance for the attachment of a rod, all as shown in Fig. 1, which illustrates the shade as it appears after the first step of the operation.

In Fig. 2, 6 represents the lower expanded portion of the shade, 2 the portion finished by the first step, and 7 the upper opening left after detaching the crack-off.

The mold of Fig. 3, which is employed in the first step of the process, consists of a base-plate 8 and a hinged two or more part mold 10, resting upon the same, the lower portion 11 of the mold forming the upper rim of the shade into finished form and the recess 12 forming the crack-off. Ornamental figures may be made upon the part 11 of the mold, as the portion of the globe therein formed is not afterward altered.

The advantages of my process lie in the increased ease and rapidity of manufacture, the workman being able to turn out about three times as many shades as formerly, while much less skilled workmen are necessary, and consequently the cost of manufacture is greatly lessened.

Many changes in the form of the mold used and in the consequent shape of the article produced may be made without departure from my invention.

What I claim is—

1. The process of manufacturing hollow glass articles, which consists in blowing the same with an unfinished top portion, a lower finished portion, and an expanded blow-over below the finished portion, detaching the blow-pipe from the unfinished portion, expanding the same, and removing the blow-over, substantially as and for the purposes described.

2. The process of manufacturing hollow glass articles, which consists in blowing the same with an unfinished top portion, a finished lower portion, and an expanded blow-over below the finished portion, detaching the blow-pipe from the unfinished portion and attaching a rod to the blow-over, expanding the unfinished portion, and removing the blow-over, substantially as and for the purposes described.

In testimony whereof I have hereunto set my hand this 6th day of June, A. D. 1891.

CHARLES ULFIG.

Witnesses:
JOHN RIZOR,
JOHN BECK.